United States Patent
Adachi et al.

(10) Patent No.: US 7,515,773 B2
(45) Date of Patent: Apr. 7, 2009

(54) FACIAL PARTS POSITION DETECTION DEVICE, METHOD FOR DETECTING FACIAL PARTS POSITION, AND PROGRAM FOR DETECTING FACIAL PARTS POSITION

(75) Inventors: Yoshihiro Adachi, Kariya (JP); Takeshi Hayashi, Kariya (JP); Junya Kasugai, Kariya (JP); Isahiko Tanaka, Susono (JP); Nobuyuki Shiraki, Owariasahi (JP); Michinori Ando, Tajimi (JP); Yoshiki Ninomiya, Nagoya (JP)

(73) Assignees: Aisin Seiki Kabushiki Kaisha, Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 419 days.

(21) Appl. No.: 11/212,716

(22) Filed: Aug. 29, 2005

(65) Prior Publication Data

US 2006/0045382 A1  Mar. 2, 2006

(30) Foreign Application Priority Data

Aug. 27, 2004   (JP) ............................. 2004-248551

(51) Int. Cl.
G06K 9/36   (2006.01)
G06K 9/00   (2006.01)
(52) U.S. Cl. ....................................... 382/291; 382/181
(58) Field of Classification Search .................. 382/118
See application file for complete search history.

(56) References Cited

U.S. PATENT DOCUMENTS 5,629,752 A   5/1997   Kinjo et al.
5,832,115 A * 11/1998   Rosenberg .................. 382/199
5,859,921 A   1/1999   Suzuki (Continued)

FOREIGN PATENT DOCUMENTS

JP   8-122944 A   5/1996

(Continued)

OTHER PUBLICATIONS

Yeon-Sik Ryu, Automatic extraction of eye and mouth fields from a face image using eigenfeatures and multilayer perceptrons, 2001, Elsevier Pattern Recognition, 2459-2466.*

(Continued)

*Primary Examiner*—Jingge Wu
*Assistant Examiner*—Max Shikhman
(74) *Attorney, Agent, or Firm*—Sughrue Mion, PLLC

(57) ABSTRACT

A facial parts position detection device which includes an image inputting device for inputting a captured face image, an ends position detecting device for detecting right and left ends position of the face on the basis of the image, a facial parts region setting device for setting facial parts region indicating a region where facial parts exists on the basis of the right and left ends of the face, a horizontal edge detecting device for detecting a horizontal edge on the basis of the image inputted by the image inputting device, a horizontal edge histogram creating device for creating a horizontal edge histogram by projecting the horizontal edge in a horizontal direction, a proposed position setting device for setting a plurality of peaks of the horizontal edge histogram as proposed positions respectively, and an optimum position detecting device for detecting an optimum position of the facial parts region.

16 Claims, 12 Drawing Sheets

U.S. PATENT DOCUMENTS

| | | | |
|---|---|---|---|
| 6,154,559 A * | 11/2000 | Beardsley | 382/103 |
| 6,389,155 B2 | 5/2002 | Funayama et al. | |
| 7,039,222 B2 * | 5/2006 | Simon et al. | 382/118 |
| 2003/0123713 A1 * | 7/2003 | Geng | 382/118 |
| 2004/0091153 A1 * | 5/2004 | Nakano et al. | 382/228 |
| 2005/0074148 A1 * | 4/2005 | Rodyushkin et al. | 382/118 |
| 2006/0045317 A1 | 3/2006 | Adachi et al. | |
| 2006/0147093 A1 * | 7/2006 | Sanse et al. | 382/115 |

FOREIGN PATENT DOCUMENTS

| | | | |
|---|---|---|---|
| JP | 8-184925 A | 7/1996 | |
| JP | 8-300978 A | 11/1996 | |
| JP | 1998-307923 A | 11/1998 | |
| JP | 11-15947 A | 1/1999 | |
| JP | 2000-339476 A | 12/2000 | |

OTHER PUBLICATIONS

Patent Abstracts of Japan, vol. 2000, No. 15 (Apr. 6, 2001) as it relates to JP 2000-339476 A (Oki Electric Ind. Co., Ltd.) (Dec. 8, 2000).

Kin Choong Yow, et al., "Feature-based human face detection," *Image and Vision Computing*, Guildford, Great Britain, vol. 15, No. 9, pp. 713-735 (1997).

Japanese Office Action dated Jan. 31, 2008.

* cited by examiner

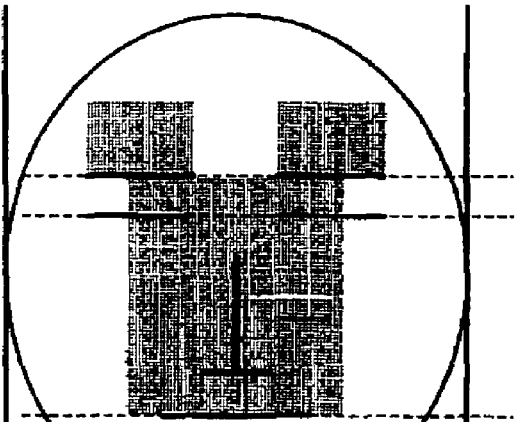
F I G. 12 A
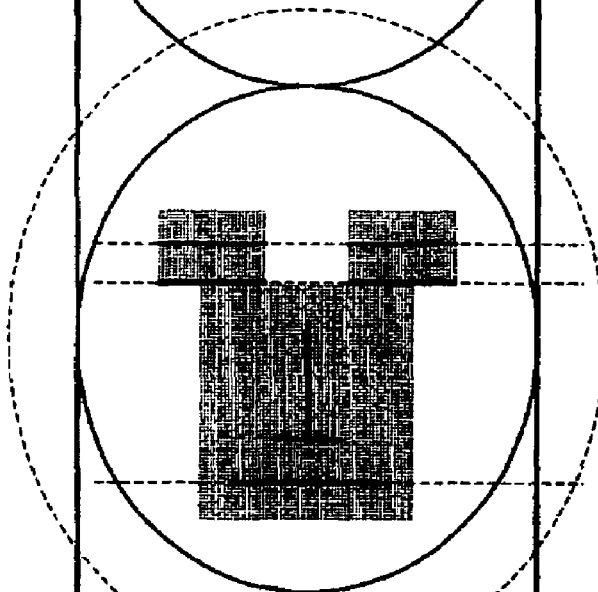
F I G. 12 B
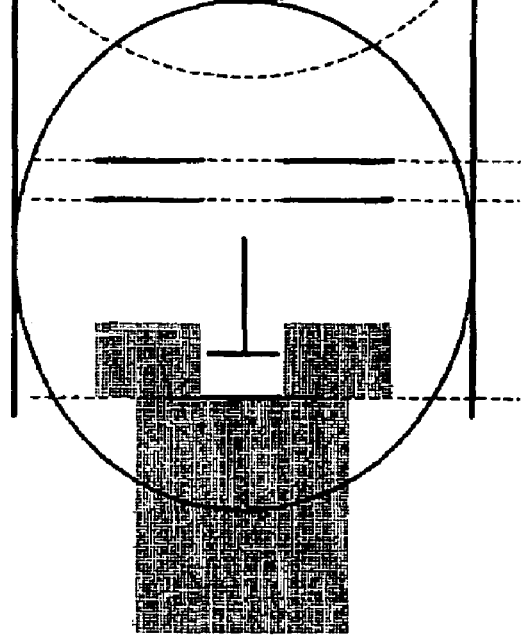
F I G. 12 C

FACIAL PARTS POSITION DETECTION DEVICE, METHOD FOR DETECTING FACIAL PARTS POSITION, AND PROGRAM FOR DETECTING FACIAL PARTS POSITION

CROSS REFERENCE TO RELATED APPLICATIONS

This application is based on and claims priority under 35 U.S.C. §119 with respect to Japanese Patent Application No. 2004-248551 filed on Aug. 27, 2004, the entire content of which is incorporated herein by reference.

FIELD OF THE INVENTION

The present invention relates to a facial parts position detection device, a method for detecting facial parts position, and a program for detecting facial parts position. More particularly, the present invention pertains to a facial parts position detection device, a method for detecting facial parts position, and a program for detecting facial parts position for detecting position of predetermined facial parts on the basis of a captured image of a face.

BACKGROUND

There are methods using patterns of edges and light and shade of a face for detecting positions of eyes. For example, a known facial parts abstracting device described in JPH10 (1998)-307923A creates a histogram by projecting darker portion of light and shade in a horizontal direction in order to obtain positions of eyes and eyebrows, and determines positions of the eyes and the eyebrows on the basis of configuration of the histogram. The facial parts abstracting device abstracts eyes, eyebrows, and a mouth by utilizing that peaks appeared in the histogram corresponding to portions such as the eyes, the eyebrows, and the mouth by creating the histogram.

A known eye position and face position detection device for stably detecting positions of eyes and a face is described in JP2000-339476A. With the known eye position and face position detection device, the center of a face is estimated on the basis of vertical edges histogram, right and left ends of the face is estimated on the basis of position of the center of the face, and histograms are created by projecting horizontal edges and vertical and horizontal edges in the horizontal direction within a range of the estimated right and left ends of the face. Accordingly, peaks appear at positions of eyes and eyebrows, and thus the eyes and the eyebrows are detected.

Notwithstanding, according to the known devices described in JPH10 (1998)-307923A and JP2000-339476A, peaks of a histogram different from peaks corresponding to the eyes and eyebrows appear around the eyes in case a driver wears glasses, and thus a position of eyes and eyebrows cannot be detected accurately. Similar problems are raised in case shade is reflected in the face when using a grayscale picture.

It is a condition for the known devices described in JPH10 (1998)-307923A and JP2000-339476A that a position of a face is approximately identified. However, in case a position of a face is off, accurate positions of eyes and eyebrows are unlikely detected because excessive peaks of a histogram other than the eyes and eyebrows appear or peaks are unreadable by the background.

Further, with the facial parts abstracting device according to JPH10 (1998)-307923A, a nostril is detected in order to specify a position of a face. However, because an image-capturing device has to be positioned below a face of an objective person in order to detect the nostril, setting location of the image-capturing device is limited.

With the eye position and face position detection device described in JP2000-339476A, the center of a face is detected first from the histogram of the vertical edges for detecting the position of the face. However, there is a drawback that an accurate position of a face is unlikely detected because it is difficult to identify the center of the face from vertical edges of a nose and glasses, or the like.

A need thus exists for a facial parts position detection device, a method for detecting facial parts position, and a program for detecting facial parts position, which securely detects position of facial parts without being influenced by conditions of objective person for detection.

SUMMARY OF THE INVENTION

In light of the foregoing, the present invention provides a facial parts position detection device, which includes an image inputting means for inputting a captured face image, an ends position detecting means for detecting right and left ends position of the face on the basis of the image inputted by the image inputting means, a facial parts region setting means for setting facial parts region indicating a region where facial parts exists on the basis of the right and left ends of the face detected by the ends position detecting means, a horizontal edge detecting means for detecting a horizontal edge on the basis of the image inputted by the image inputting means, a horizontal edge histogram creating means for creating a horizontal edge histogram by projecting the horizontal edge detected by the horizontal edge detecting means in a horizontal direction, a proposed position setting means for setting a plurality of peaks of the horizontal edge histogram as proposed positions respectively by the horizontal edge histogram creating means, and an optimum position detecting means for detecting an optimum position of the facial parts region on the basis of the facial parts region set by the facial parts region setting means and each proposed position set by the proposed position setting means.

According to another aspect of the present invention, a method for detecting facial parts position includes process of detecting right and left ends position of a face on the basis of a captured face image, setting a facial parts region indicating a region where facial parts exists on the basis of right and left ends position of the detected face, detecting a horizontal edge on the basis of the captured image, creating a horizontal edge histogram by projecting the detected horizontal edge in a horizontal direction, setting a plurality of peaks of the created horizontal edge histograms as proposed positions, and detecting and optimum position of the facial parts region on the basis of each set proposed position and the set facial parts region.

According to further aspect of the present invention, a program for detecting facial parts position which makes a computer execute transactions includes detecting right and left ends position of a face on the basis of a captured face image, setting a facial parts region indicating region where facial parts exists on the basis of the detected right and left ends position of the face, detecting a horizontal edge on the basis of the captured image, creating a horizontal edge histogram by projecting the detected horizontal edge in a horizontal direction, setting a plurality of peaks of the created horizontal edge histogram as proposed positions, and detecting an optimum position of the facial parts region on the basis of each of the set proposed position and the set facial parts region.

BRIEF DESCRIPTION OF THE DRAWINGS

The foregoing and additional features and characteristics of the present invention will become more apparent from the following detailed description considered with reference to the accompanying drawings, wherein:

FIG. 12A-12C are views explaining matching a proposed position of eyes to the facial parts region.

DETAILED DESCRIPTION

Embodiments of the present invention will be explained with reference to illustrations of drawing figures as follows. Although embodiments of the present invention will be explained with an example for detecting facial parts of a driver by capturing an image of a face of the driver who operates a vehicle, facial parts of a face other than the driver may be detected according to the present invention.

A first embodiment of the present invention will be explained as follows. A facial parts position detection device includes a camera 10 (i.e., serving as an image capturing means) for creating a face image by capturing an image of a driver's face, an illumination light source 12 for illuminating the face of the driver, a computer 14 for detecting facial parts positions (i.e., the computer 14 serves as a facial parts position detecting means), and a display 16 connected to the computer 14.

The face image created by the camera 10 includes a face of the driver and the background. The display 16 includes an LCD (Liquid Crystal Display) or a CRT (Cathode Ray Tube), and displays binary image, or the like, which is abstracted from the face image captured by the camera 10.

Figure 1:
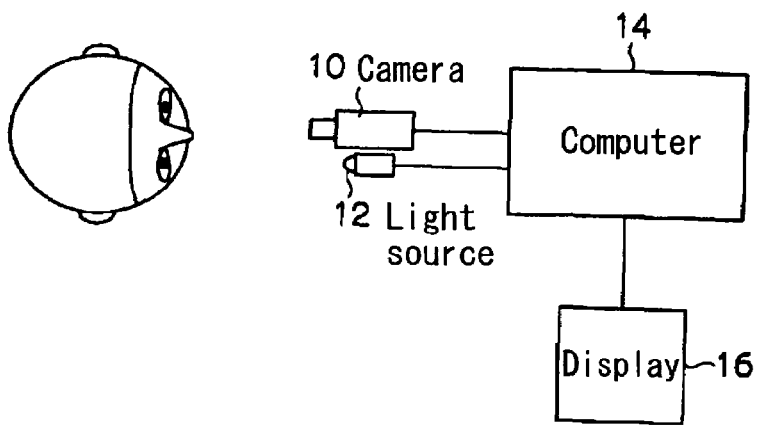
FIG. 1 is a view showing a construction of a facial parts position detection device according to a first embodiment of the present invention.
Figure 2:
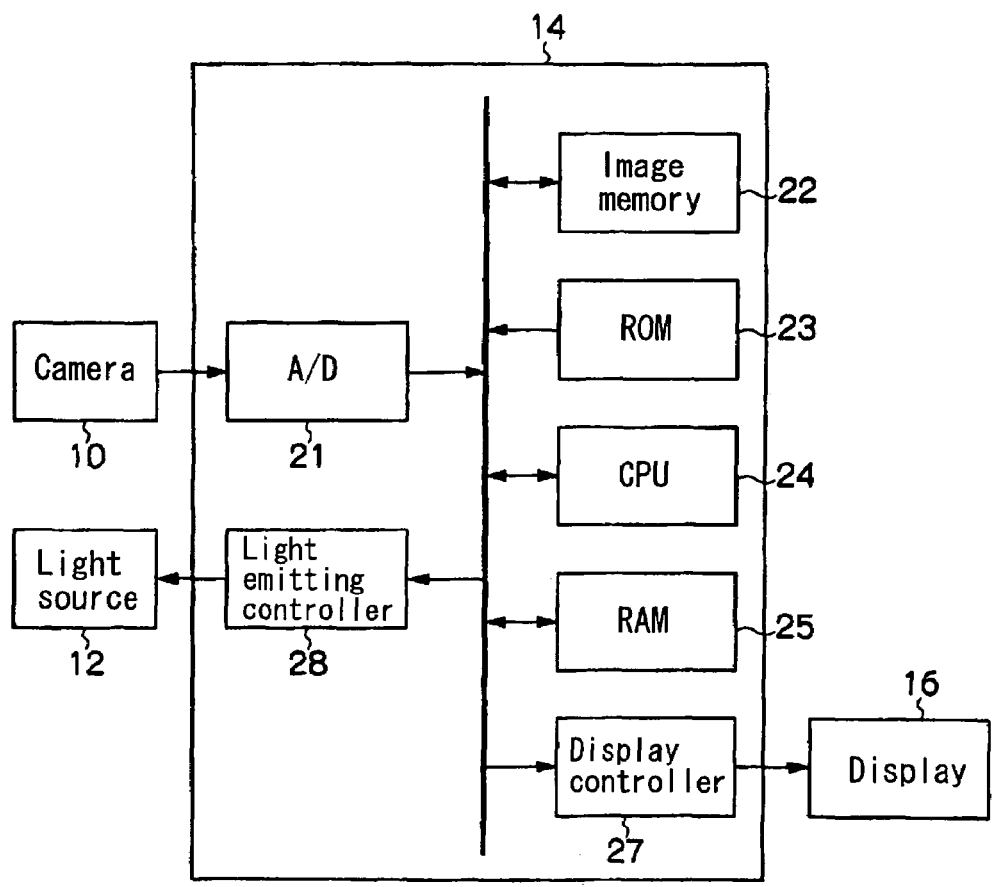
FIG. 2 is a block view showing a construction of a computer.

As shown in FIG. 2, the computer 14 includes an analogue/digital (A/D) converter 21 for converting the captured image by the camera 10 into a digital signal, an image memory 22 for memorizing a face image created by the camera 10, a ROM 23 in which a program for detecting facial parts position is stored (i.e., the ROM 23 serves as the facial parts position detecting means), a CPU 24 for executing a predetermined calculation on the basis of the program memorized in the ROM 23, a RAM 25 serving as a work area of data, a display controller 27 for controlling display at the display 16, and a light emitting controller 28 for controlling the light source 12 so as to be on and off.

Figure 3:
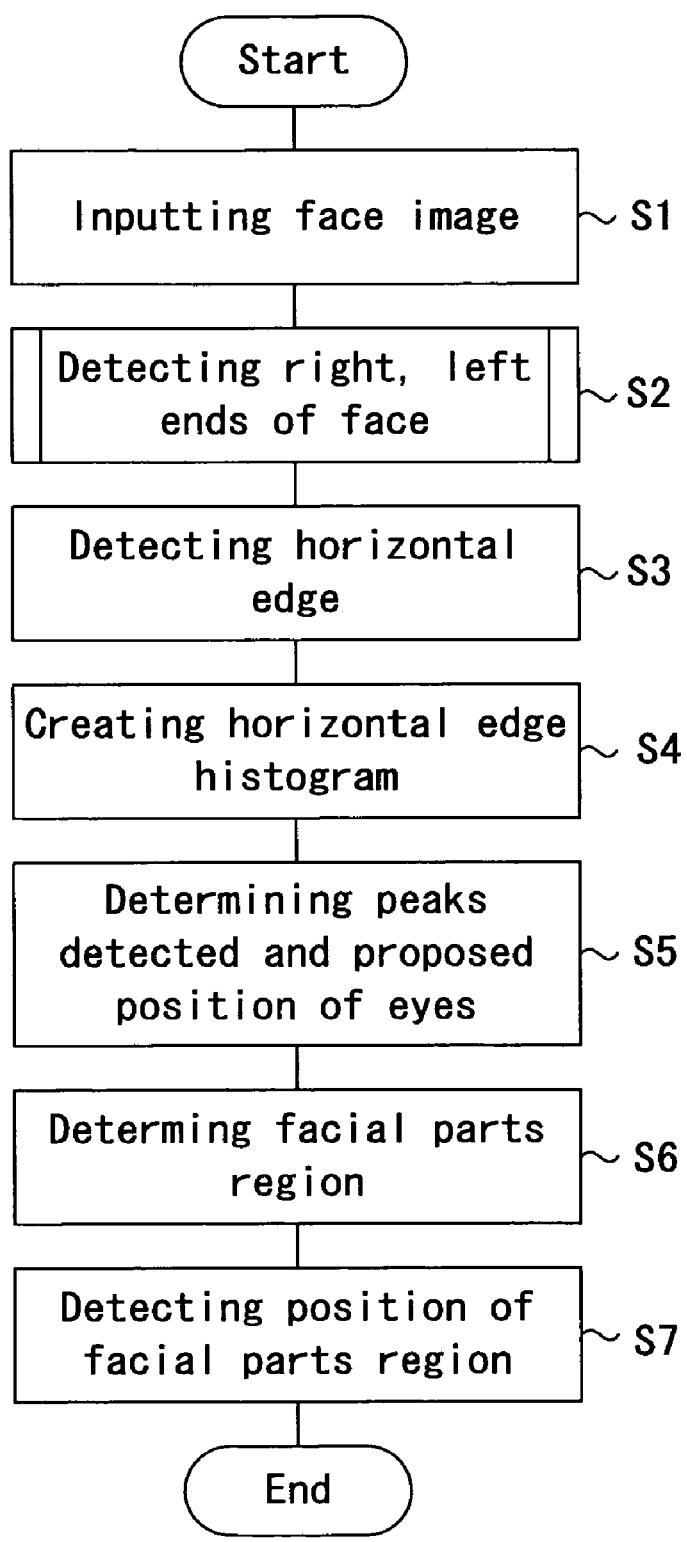
FIG. 3 is a flowchart showing a routine of a facial parts position detection program memorized in a ROM.
Figure 4:
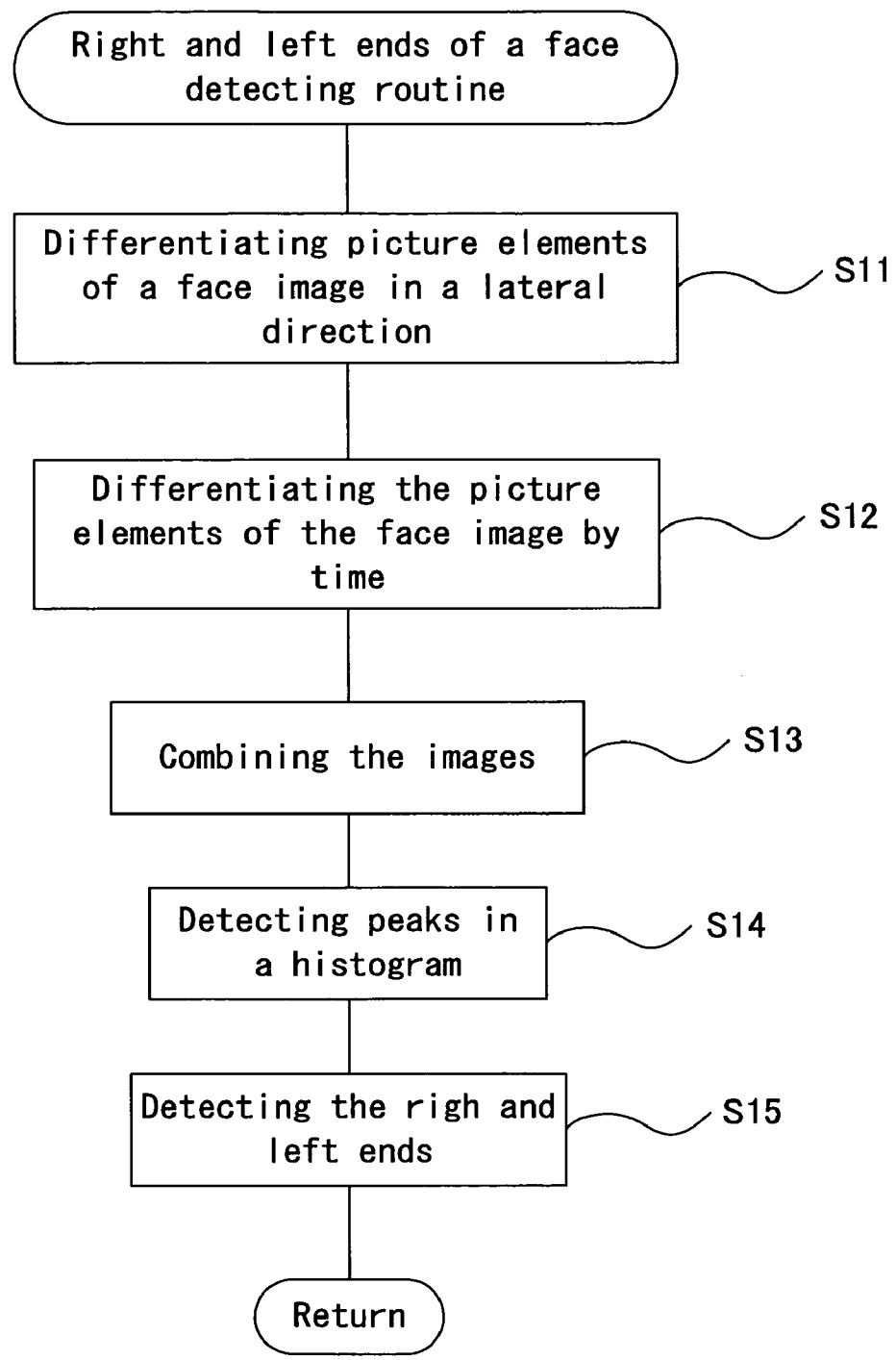
FIG. 4 is a flowchart showing an example of a right and left ends of face detecting routine at Step S2.

As shown in FIG. 3, the CPU 24 executes Step S1 through Step S7 following the transaction routine.

At Step S1, the CPU 24 inputs a face image, which is captured by the camera 10, into the computer 14, and the face image is written on the image memory 22 by means of the A/D converter 21 (i.e., the CPU 24 serves as an image inputting means). Then, the process proceeds to Step S2.

At Step S2, the CPU 24 detects right and left ends of a driver's face, that is, the right and left ends of a driver's face (i.e., the CPU 24 serves as an ends position detecting means). For example, the CPU 24 calculates vertical edges of the face image and creates a histogram by projecting the calculated vertical edges in a vertical direction. In this case, because peaks appear at right and left ends of the face, the peaks are detected as ends of the face, that is right and left positions of the driver's face. It is preferable to eliminate noise (e.g., background such as a headrest and window frame) by weighing picture element by means of a time subtraction or length for creating the histogram. The right and left ends of the face may be detected by another method such as a template matching and range image, or the like. Particularly, the CPU 24 executes the following transaction.

Figure 5:
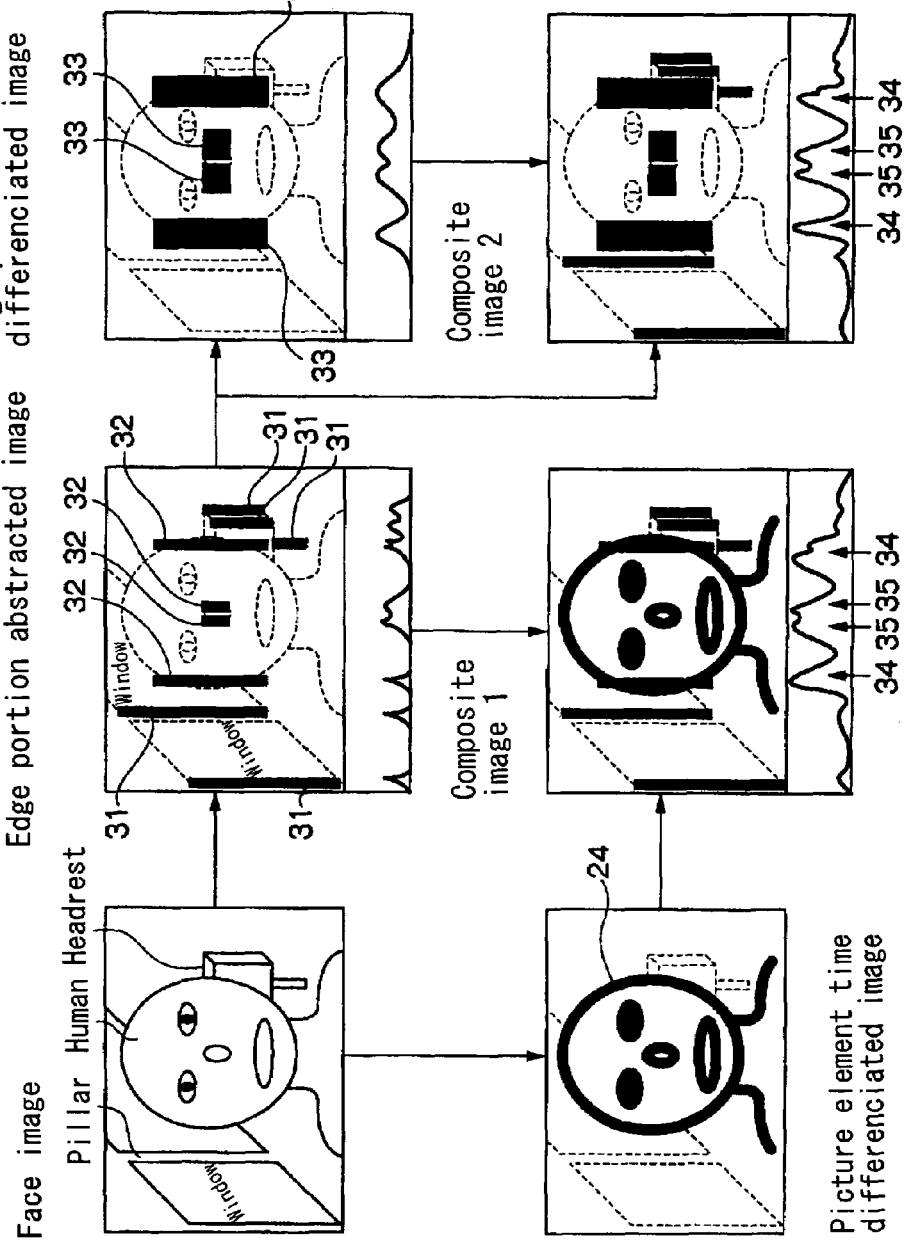
FIGS. 5A-5F are views showing images created at each process of the right and left ends of the face detecting routine.

At Step S11, the CPU 24 reads the face image (shown in FIG. 5A) from the image memory 22, and differentiates picture element value (pixel value) of the face image in a horizontal direction (i.e., lateral direction). More particularly, difference between luminance of each picture element and luminance of a picture element adjacent the picture element is calculated, and an edge portion abstracted image (shown in FIG. 5B) is created. Then, the process proceeds to Step S12. Dotted line in FIG. 5B shows outlines of the original image. Vertical edges 31 of the background and vertical edges 32 of the face image are abstracted in the edge portion abstracted image, and the outline of the original image shown with the dotted line is scarcely remained. The vertical edges 31, 32 are abstracted even when the driver is not in motion.

In case the picture element value of the edge portion abstracted image (i.e., differential value of luminance) is projected in a vertical direction (i.e., lengthwise direction), a histogram is obtained as shown at a bottom of FIG. 5B. In this histogram, the right and left ends of the face cannot be specified because intensity of the all edge portions are approximately the same.

At Step S12, the CPU 24 reads the face image (shown in FIG. 5A) from the image memory 22, and the picture element value of the face image is differentiated by time. Particularly, difference between luminance of each picture element at a certain time and luminance of each picture element at an immediately preceding time is calculated, and a picture element value time differential image (shown in FIG. 5C), in which only moving object emphasized is created. Then, the process proceeds to Step S13.

Because the driver is not at completely standstill state during vehicle operation, only outlines of a moving object, that is, an outline of a driver is shown with thick line in the picture element value time differential image. On the other hand, because another object in the background such as windows, pillars, and headrests remain stationary, outlines of the object in background is scarcely remained in the picture element value time differential image. Thus, with the picture element value differential image, the outline of the face is detected when the driver moves, but the outline of the face is unlikely detected when the driver hardly moves. In order to overcome this problem, the following transaction is required to be executed.

At Steps S13-S14, the CPU 24 creates a composite image 1 (shown in FIG. 5D) by combining the edge portion abstracted image and a picture element value time differential image, and creates a histogram by projecting picture element value (i.e., luminance) of the composite image 1 in a vertical direction. The composite image 1 is created by combining the edge portion abstracted image and the picture element value time differential image. Accordingly, vertical edges or outlines of the driver is appeared in the composite image 1 irrespective of whether the driver is in motion or not.

Alternatively, two histograms may be created by projecting picture element value of the edge portion abstracted image in a vertical direction and projecting picture element value of the picture element value time differential image also in the vertical direction, and two histograms may be combined. Thereafter, peaks 34, 35 are detected in the histogram of the composite image 1, and a process proceeds to Step S15.

At Step S15, the CPU 24 selects two peaks having a peak interval, which matches the best to a face width of a human from the plural peaks 34, 35 detected from the histogram of the composite image 1, and determines two peaks as right and left ends of the face. This ends the transaction at the right and left ends of a face detecting routine, and the process proceeds to Step S3 shown in FIG. 3.

The right and left ends of the face detecting routine is not limited to the foregoing process, and may be constructed as follows.

For example, the CPU 24 may use the edge portion abstracted image (shown in FIG. 5B) as an object of the time differential calculation of the picture element value instead of the face image (shown in FIG. 5A) at Step S12. In other words, at Step S12, picture element value (i.e., luminance) of the edge portion abstracted image (shown in FIG. 5B) is differentiated by time in order to create an edge portion time differential image (shown in FIG. 5E). Accordingly, by deleting vertical edges of the background such as a window and a headrest which do not move among plural vertical edges 31, 32 in the edge portion abstracted image as shown in FIG. 5B, only the vertical edges 33 of the face image in motion can be abstracted as shown in FIG. 5E.

In the alternative process, the CPU 24 executes similar process as the above after Step S13. At Steps S13 and S14, the CPU 24 creates a composite image 2 (shown in FIG. 5F) by combining the edge portion abstracted image and the edge portion time differential image likewise the foregoing, and a histogram is created by projecting a picture element value (luminance) of the composite image 2 in the vertical direction. Based on the created histogram, the peaks 34, 35 can be detected.

Figure 6:
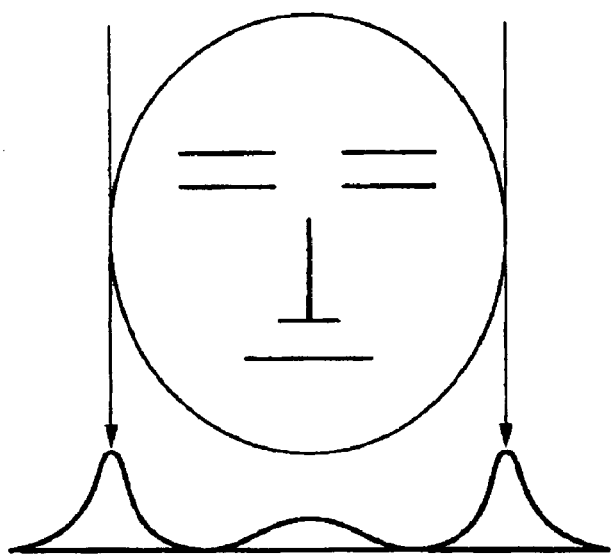
FIG. 6 is a view showing a state where right and left ends of the face is detected by the right and left ends of the face detecting routine.

As shown in FIG. 6, the CPU 24 selects two peaks having peak intervals which is the best match to face width of the human from the plural peaks of the histogram, and detects two peaks as the right and left ends position of the face.

Thus, the CPU 24 selects right and left ends of the face by executing the right and left ends of the face detecting routine without being influenced by the movement of the objective person and the background. Thereafter, process after Step S3 shown in FIG. 3 is executed.

At Step S3, the CPU 24 detects horizontal edges which changes in the vertical direction (i.e., white-black-white edge) of the face image memorized in the image memory 22 and captured by the camera 10 using a predetermined threshold (i.e., the CPU 24 serves as a horizontal edge detecting means). In the horizontal edges (white-black-white edges), the picture element change, in a vertical direction, from white to black, and then from black to white. Then, the process proceeds to Step S4.

In Step S4, when vertical length of the face in the image is approximately sixty pixels, the CPU 24 may detects black pixels, that is picture elements with low luminance, with 2-4 pixel length in the vertical direction. In this process, because the black pixels having one-pixel widths is ignored, noise element can be eliminated. Further, by limiting the length of picture element to be detected equal to or less than four pixels, detection can be performed particularly to facial parts including eyebrows, eyes, a nose, and a mouth. The detection length in the vertical direction of the picture element is not limited to the above-mentioned value, and may be changed when the vertical length of the face is significantly different from sixty pixels accordingly. Further, the CPU 24 may detect not only the white-black-white edges, but also normal white-black edges.

Among the horizontal edges, only the horizontal edges having horizontal length of equal to or longer than a predetermined value (e.g., equal to or more than ten percent of face width) may be detected. Accordingly, short horizontal edges because of the noise can be eliminated. In this case, criteria value equal to or more than ten percent is defined on the basis of statistical data of the face image because the width of facial parts relative to the face width assumes equal to or more than ten percent.

Figure 7:
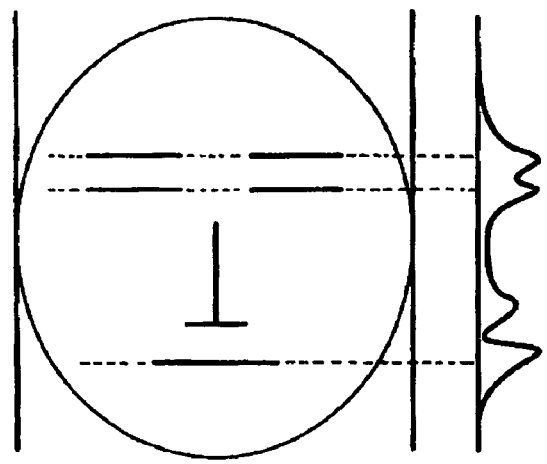
FIG. 7 is a view showing a horizontal edges obtained when a driver is at an ideal condition and a horizontal edge histogram corresponding to the horizontal edges when the driver is at the ideal condition.

FIG. 7 shows horizontal edge obtained when a driver is at an ideal condition (e.g., the driver does not wear glasses or sunglasses, hairs do not grow over eyes of the driver, and a face of the driver is straight).

At Step S4, the CPU 24 creates a horizontal edge histogram indicating the intensity of the horizontal edge in the horizontal direction by projecting the horizontal edge in the horizontal direction (i.e., the CPU 24 serves as a horizontal edge histogram creating means). Thereafter, the process proceeds to Step S5.

At Step S5, the CPU 24 detects peaks of the horizontal edge histogram, and sets the detected peaks as a proposed position of eyes (i.e., the CPU 24 serves as a proposed position setting means). Then, the process proceeds to Step S6. The peaks of the horizontal edge histogram, as shown in FIG. 7, mainly appear at eyebrows, eyes, a nose, and a mouth. Although the number of peaks of the horizontal edge histogram to be detected is not specified, it is preferable that the number of the peaks assumes equal to or greater than six considering there are characteristics of face images such as eyes, eyebrows, frames at the bottom and the top of glasses, a mouth, a nose, or the like.

In case the driver is at the ideal condition, for example, mentioned above, position of eyebrows, eyes, a nose, and a mouth can be determined by abstracting peaks of the horizontal histogram shown in FIG. 7 in order from the top.

However, in practice, a driver is not always at the ideal condition, and clear peaks may not be obtained because of influence by the background, hairstyle, glasses, and sunglasses. Peaks, even if they are not clear appear at portions corresponding to eyebrows, eyes, and a mouth even at the foregoing undesired conditions.

Figure 8A:
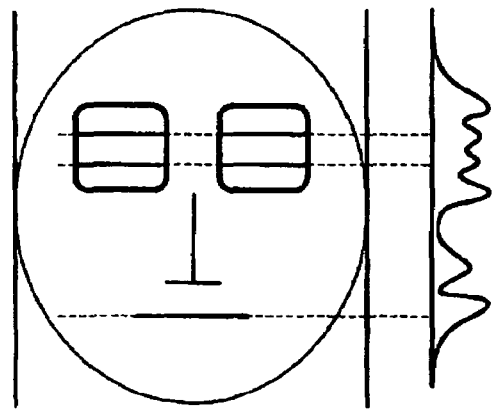
FIG. 8A is a view showing horizontal edges and a horizontal edge histogram corresponding to the horizontal edges when a driver wears glasses.
Figure 8B:
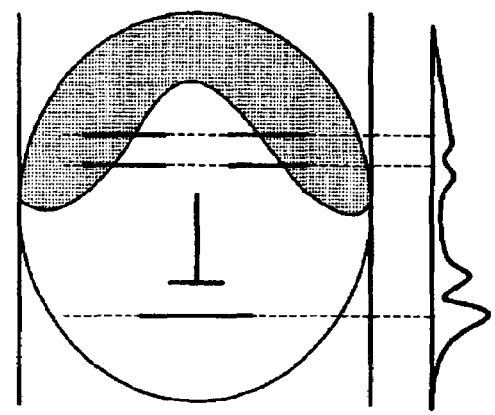
FIG. 8B is a view showing horizontal edges and a horizontal edge histogram corresponding to the horizontal edge when hairs grows over eyes and eyebrows.
Figure 8C:
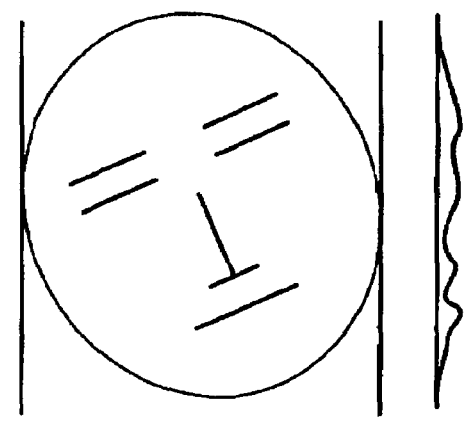
FIG. 8C is a view showing horizontal edges and a horizontal edge histogram corresponding to the horizontal edges when a face is tilted to the right or left.

Referring to FIGS. 8A-8C, although peaks of the histograms in FIGS. 8A-8C are not clear compared to the peaks shown in FIG. 7, the peaks are obtained. The CPU 24 determines unclear peaks of the horizontal edge histogram as shown, for example, in FIGS. 8A-8C as proposed positions of eyes.

At Step S6, the CPU 24 determines regions corresponding to configurations of eyebrows, eyes, a nose, and a mouth (i.e., hereinafter referred as facial parts region) on the basis of a pre-memorized facial parts template, and the right and left ends of the face detected at Step S1 (i.e., the CPU 24 serves as a facial parts region setting means).

Figure 9:
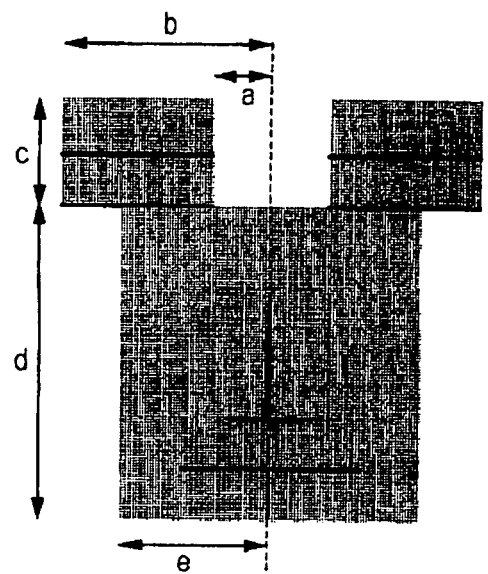
FIG. 9 is a view showing a facial parts template.

A facial parts template shown in FIG. 9 shows position of facial parts such as eyebrows, eyes, a nose and a mouth and ratio of the region of each of the facial parts on the assumption that a face faces front. The facial parts template defines length a from the center of face to the inner corner of an eye, length b from the center of the face to the corner of eye, length c from bottom of eyes to top of eyebrows, length d from bottom of eyes to bottom of a mouth, and length e from the center of the face to the corner of the mouth when face width is defined as reference value 100. Here, each length is defined as follows: a=10, b=40, c=30, d=60, and e=30. These lengths are determined on the basis of statistical size of facial parts of human, and is not limited to the foregoing values.

Figure 10:
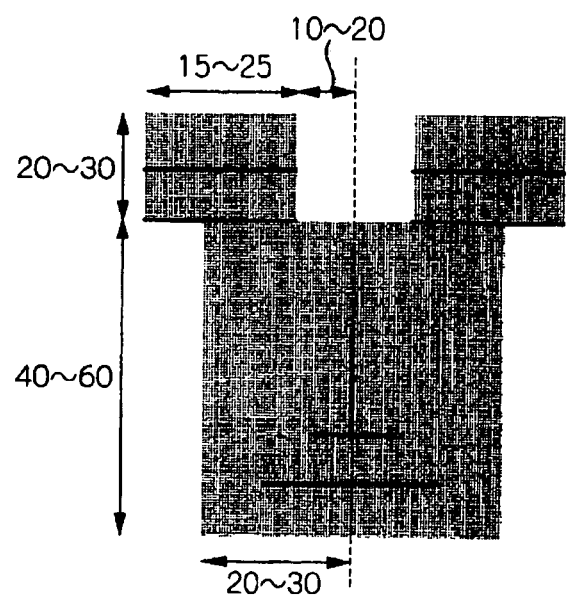
FIG. 10 is a view showing a statistical size of human facial parts.

FIG. 10 shows statistical size of facial parts of the human. When the face width is defined as reference value 100, size of the facial parts is statistically defined as follows.

Length from the center of face to the inner corner of an eye: 10-20

Length from the inner corner of the eye to the corner of the eye: 15-25

Length from the bottom of eyes to the top of eyebrows: 20-30

Length from the bottom of eyes to the bottom of a mouth: 40-60

Length from the center of the face to the corner of the mouth: 20-30

Accordingly, it is preferable that the facial parts template is formed within the statistical range. In case of customizing the facial parts template to a particular individual, length of each portion of the facial parts template is not limited to the statistical range.

Figure 11:
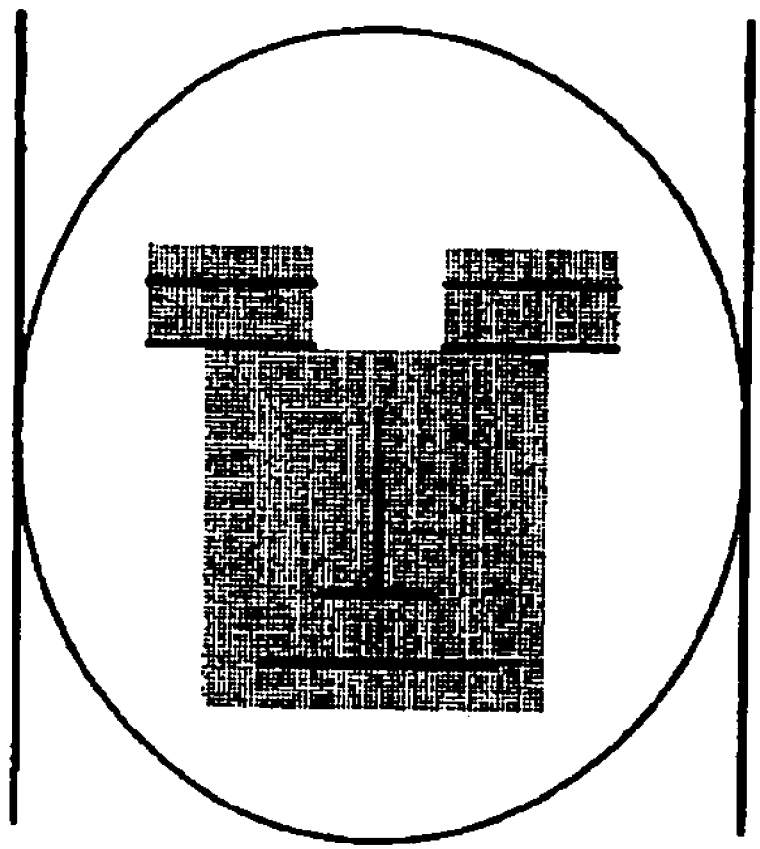
FIG. 11 is a view showing a facial parts region determined at a transaction of Step S6.

Size of the face image differs depending on a distance from a drier to the camera 10. Accordingly, the CPU 24, as shown in FIG. 11, determines the facial parts region on the basis of the face image template and the right and left ends of the face. Then, transaction advances to Step S7.

At Step S7, the CPU 24 outputs detection result of position of eyes, a nose, and a mouth by matching the facial parts region and peaks of the horizontal edge histogram (i.e., the proposed position of eyes).

As shown in FIG. 12A-12C, whether the facial parts region is at correct position is validated by matching the proposed position of eyes and position of eyes of the facial parts region. According to the embodiment of the present invention, the CPU 24 validates whether position of eyes of the facial parts region is at the correct position using symmetry of the facial parts region. That is, the position of eyes of the facial part region is applied to the proposed position of the eyes one another, in order to count points of the horizontal edge which assumes symmetry within the facial parts region. When the count value assumes the maximum, the degree of the symmetry assumes the highest, and at that point, the position of the facial parts region agrees with the position of actual eyes, a nose, and a mouth.

The CPU 24 detects the horizontal edge which is symmetric with respect to an axis of symmetry within the facial parts region, and point are counted when detecting the horizontal edges of a predetermined length in the both right and left direction. Instead of the horizontal edge of the predetermined length, a horizontal edge in a predetermined region may be detected because it is sufficient if an object symmetrically extended can be detected.

Figure 13A:
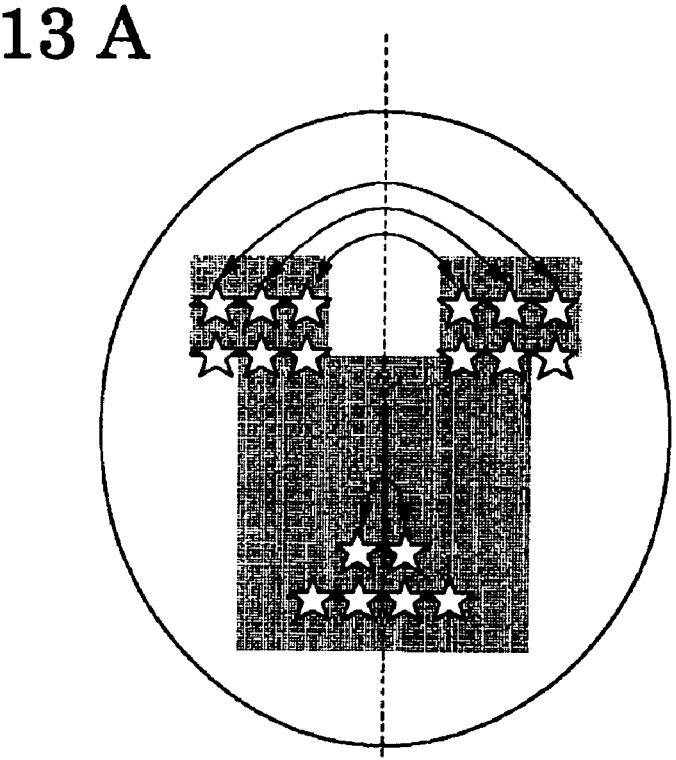
FIG. 13A is an explanatory view for calculation of symmetry by a CPU 24 when the degree of symmetry is high.
Figure 13B:
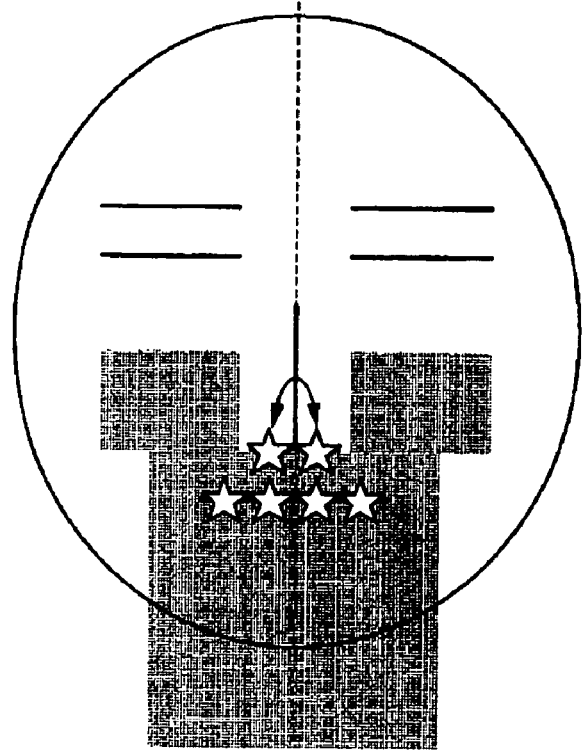
FIG. 13B is an explanatory view for calculation of symmetry by the CPU 24 when the degree of symmetry is low.

For example, as shown in FIG. 13A, symmetry (i.e., count value) equals to nine (9) because nine points are symmetric. In FIG. 13B, the symmetry equals to three (3) because three points are symmetric. In this case, facial parts region positioned at FIG. 13A agree with the actual positions of eyes, a nose, and a mouth.

Further, the CPU 24 can detect each position of eyebrows, eyes, a nose, and a mouth in the facial parts region as the actual positions of the eyebrows, the eyes, the nose, and the mouth respectively after detecting the optimum position of the facial parts region (i.e., the CPU 24 serves as an optimum position detecting means).

As foregoing, the facial parts position detection device according to the first embodiment of the present invention creates the horizontal edge histogram which reflects horizontal edges of face image in the horizontal direction, sets the respective plural peaks of the horizontal edge histogram as proposed position of eyes, and matches the proposed position of the eyes and the facial parts region detects optimum position of the facial parts region. Thus, the facial parts position detection device can securely detect the position of the facial parts because the plural peaks are set as proposed position of eyes in order to be matched to the facial parts region even when peaks of the horizontal edges corresponding to the eyes is unlikely appeared because a driver wears glasses or hairs grow over eyes and eyebrows.

Because the facial parts position detection device considers symmetry of the horizontal edges of eyebrows, eyes, a mouth, or the like, when matching the proposed position of eyes to the facial parts region, the facial parts position can be detected without being influenced by noise.

A second embodiment of the present invention will be explained as follows. The same numerals are provided to the same portion of the first embodiment, and the explanation will not be repeated.

The facial parts region determined at Step S6 is determined on the assumption that the face faces front. Thus, when the driver turns the face sideways, the determined facial parts region cannot be applied as it is at Step S6.

Figure 14:
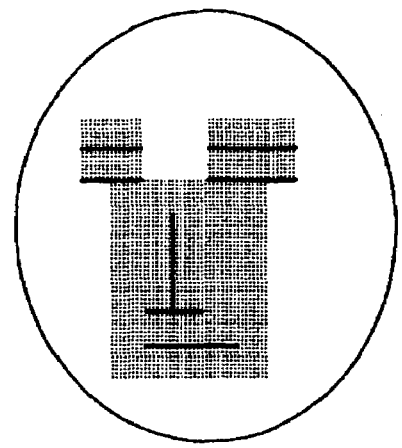
FIG. 14 is a view showing facial parts region on the assumption that a face turns sideways.

As shown in FIG. 14, when the driver turns the face sideways, it is necessary that width of eyebrows and eyes of the facial parts region at a side that the face is turning assumes narrower than widths of eyebrows and eyes at the other side.

According to the second embodiment of the present invention, facial parts region, for example, as shown in FIG. 14, can be determined even when the face turns sideways. Assuming that a face has cylindrical shape, facial parts region is deformed in accordance with turning direction of the face (i.e., turning angle of the face).

Figure 15:
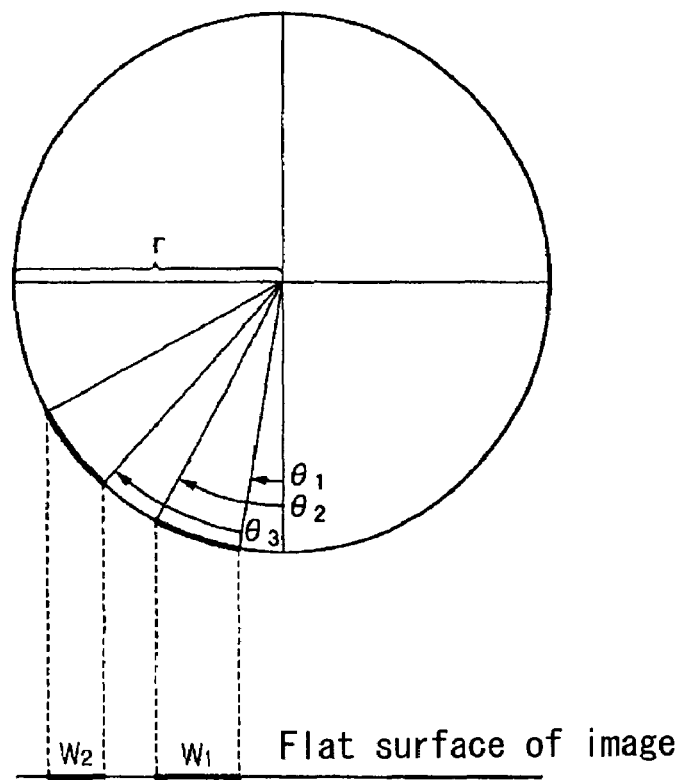
FIG. 15 is a view showing a head of a person viewed from the top.

As shown in FIG. 15, viewing a head of the human from the top, facial parts such as eyes are positioned on a cylinder as indicated with bold lines in FIG. 15. Projecting the bold lines on flat surface of image, width of facial parts closer to ends of the face becomes narrower than width of facial parts closer to the center of the face.

Provided that angles for determining region of facial parts is $\theta_1$, $\theta_2$, a rotational angle of facial parts about vertical axis direction (i.e., turning angle of the face) is $\theta_3$, and half the length of face width is r, facial parts width $W_1$ when the face faces front and a facial parts width $W_2$ when the face turns sideways assume as follows.

$$W_1 = r(\sin\theta_2 - \sin\theta_1)$$

$$W_2 = r\{\sin(\theta_2 + \theta_3) - \sin(\theta_1 + \theta_3)\}$$

$\theta_1$, $\theta_2$ are values uniquely determined simultaneously with determining facial parts template, and r is half the length of right and left ends of the face detected at Step S2.

Accordingly, when the face turns sideways, the CPU 24 may perform the following calculation at Step S6. That is, likewise the first embodiment of the present invention, after determining a facial parts region on the basis of the facial parts template and the right and left ends of the face, face turning angle $\theta_3$ is detected, and the facial parts width $W_2$ is calculated on the basis of the turning angle $\theta_3$. Transaction other than Step S6 is conducted likewise the first embodiment of the present invention.

Although the foregoing is explained assuming that the human face (head) is circular, the human face may be assumed as other configurations including oval, sphere, and elliptic sphere. By studying statistical configuration of the head, the studied configuration may be set as the configuration of the head.

Figure 16:
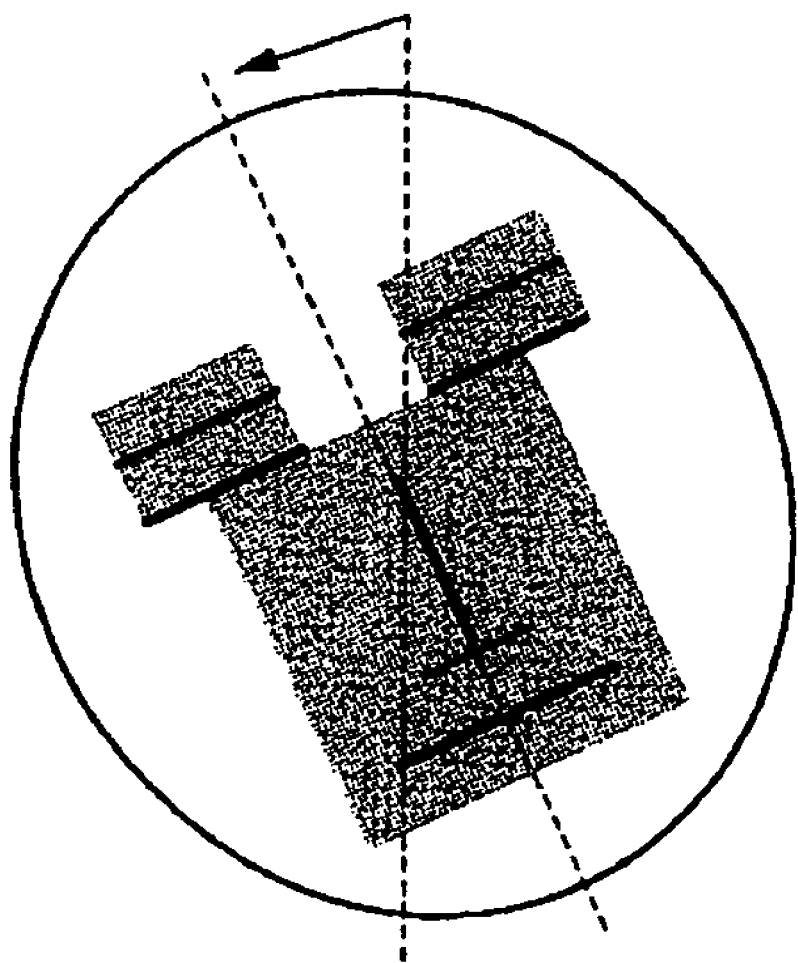
FIG. 16 is a view showing a facial parts region on the assumption that a face is tilted.

FIG. 16 shows facial parts region on the assumption that a face is tilting to the right and left. Rotating a head about an axis extended in a front direction at the center of right and left ends of the face, calculation of the symmetry is conducted on that rotation coordinate system.

As foregoing, with the facial parts position detection device according to the second embodiment of the present invention, angle that a face turns sideways and tilting angle of the face are detected, the facial parts region is determined in accordance with the detected angle, and the determined facial parts region and the proposed position of the eyes are matched each other for detecting the optimum position of the facial parts position even when the face turns sideways or the face is tilted to the right or left. Accordingly, likewise the first embodiment of the present invention, positions of the desired facial parts including eyebrows, eyes, a nose, and a mouth can be detected.

The present invention is not limited to the first and the second embodiments, and is applicable to other designs within the range of the claims.

For example, the CPU 24 may read a program memorized on other medium such as a magnetic disc or an optical disc, and may detect the facial position on the basis of the program memorized on other medium instead of the program memorized in the ROM 23.

According to the embodiment of the present invention, the image inputting means inputs the captured face image. The image includes not only a face of the subjective person, but also the background.

According to the embodiment of the present invention, the ends position detecting means detects the right and left ends position of the face on the basis of the inputted image. Accordingly, length from one end to the other end of the face can be detected.

According to the embodiment of the present invention, the facial parts region setting means sets a facial parts region indicating the region where the facial parts exists on the basis of the right and left ends of the face. Because a distance from the human face to the means for capturing image for capturing the image of the face is not always constant, the size of the inputted image of the face is not always constant. Thus, the facial parts region setting means sets the facial parts region on the basis of the right and left ends position of the face.

The horizontal edge detecting means detects the horizontal edge in the inputted image. The horizontal edge histogram creating means creates the horizontal edge histogram by projecting the horizontal edge in the horizontal direction. With the horizontal edge histogram, peaks appear in accordance with the intensity of the horizontal edge in the horizontal direction.

The proposed position setting means sets plural peaks of the horizontal edge histogram as the proposed positions. Peaks of the horizontal edge histogram show a position where the horizontal edge is intensified, which is most likely the facial parts such as eyebrows, eyes, a nose, and a mouth of the face are positioned. Accordingly, these peaks are determined as the proposed position of the optimum position of the facial parts region.

According to the embodiment of the present invention, the optimum position detecting means detects the optimum position of the facial parts region by matching the facial parts region to each of the proposed position on the basis of the set facial parts region and each of the proposed position.

With the facial parts position detection device, a method for detecting the facial parts position, and a program for detecting the facial parts position according to the embodiment of the present invention, the facial parts position can be securely detected avoiding the influence of conditions of the subjective person who, for example, wears glasses and hairs grows over eyes on the basis of the set facial parts region and each of the proposed position.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A facial parts position detection device comprising:
    an image inputting means for inputting a captured face image;
    an ends position detecting means for detecting right and left ends position of the face on the basis of the image inputted by the image inputting means;
    a facial parts region setting means for setting facial parts region indicating a region where facial parts exists on the basis of the right and left ends of the face detected by the ends position detecting means;
    a horizontal edge detecting means for detecting a-horizontal edges on the basis of the image inputted by the image inputting means;
    a horizontal edge histogram creating means for creating a horizontal edge histogram by projecting the horizontal edges of the facial parts detected by the horizontal edge detecting means in a horizontal direction;

a proposed position setting means for setting a plurality of peaks of the horizontal edge histogram as proposed positions respectively by the horizontal edge histogram creating means; and an optimum position detecting means for detecting an optimum position of the facial parts region on the basis of the facial parts region set by the facial parts region setting means and each proposed position set by the proposed position setting means;

wherein the optimum position detecting means detects the horizontal edges, which are symmetric with respect to an axis of symmetry, in the facial parts region by applying the facial parts region to the each proposed position, and detects a position of the facial parts region where the number of horizontal edges, which are symmetric with respect to the axis of symmetry, is the maximum as the optimum position of the facial pads region.

2. The facial parts position detection device according to claim 1, further comprising:

a facial parts position detecting means for detecting a position of at least one of eyebrows, eyes, a nose, and a mouth of the face on the basis of the optimum position of the facial parts region detected by the optimum position detecting means.

3. The facial parts position detection device according to claim 1, wherein the facial pads region setting means sets the facial parts region by adjusting region width at a first side and region width at a second side relative to an axis of symmetry of the facial pads region in accordance with a rotational angle about a vertical axis of the facial parts.

4. The facial parts position detection device according to claim 1, wherein the facial parts region setting means sets the facial parts region to rotate the facial parts region in accordance with rotational angle about an axis in a front direction at the center of the facial parts.

5. The facial parts position detection device according to claim 1, further comprising:

an image capturing means for creating an image by capturing an image of a human face and for supplying the captured image to the image inputting means.

6. A method for detecting facial parts position, comprising using a processor to perform the steps of:

detecting right and left ends position of a face on the basis of a captured face image;

setting a facial parts region indicating a region where facial parts exists on the basis of right and left ends position of the detected face;

detecting horizontal edges of the facial parts on the basis of the captured image;

creating a horizontal edge histogram by projecting the detected horizontal edges of the facial parts in a horizontal direction;

setting a plurality of peaks of the created horizontal edge histograms as proposed positions; and detecting an optimum position of the facial parts region on the basis of each set proposed position and the set facial parts region by detecting the horizontal edges, which are symmetric with respect to an axis of symmetry, in the facial parts region by applying the facial parts region to the each proposed position, and detecting a position of the facial parts region where the number of horizontal edges, which are symmetric with respect to the axis of symmetry, is the maximum as the optimum position of the facial parts region.

7. The method for detecting facial parts position according to claim 6, wherein a position of at least one of eyebrows, eyes, a nose, and a mouth of the face is detected on the basis of the optimum position of the detected facial parts region.

8. The method for detecting facial parts position according to claim 6, wherein the facial parts region is set by adjusting region width at a first side and region width at a second side relative to an axis of symmetry of facial parts region in accordance with a rotational angle about a vertical axis direction of facial parts.

9. The method for detecting facial parts position according to claim 6, wherein the facial parts region is set for rotating a facial parts region in accordance with a rotational angle about axis in a front direction at the center of the facial parts.

10. The method for detecting facial parts position according to claim 6, wherein the plural peaks are proposed positions of the optimum position of the facial parts region as positions of facial parts including eyebrows, eyes, a nose, and a mouth of the face.

11. The method for detecting facial parts position according to claim 6, wherein the facial parts region and each of the proposed position are matched.

12. The method for detecting facial parts position according to claim 11, wherein the peaks of the horizontal edge histogram is detected from a top in order and determined as the proposed position of the facial parts including the eyebrows, the eyes, the nose, and the mouth.

13. The method for detecting facial parts position according to claim 6, wherein the right and left ends position of the face creates a vertical edge histogram by projecting a vertical edge in a vertical direction and detects right and left ends of the face by peaks of the vertical edge histogram.

14. The method for detecting facial parts position according to claim 6, wherein a facial parts template pre-memorized in a memory is applied to the facial parts.

15. The method for detecting facial parts position according to claim 14, wherein the facial parts template indicates ratio of region and positions of facial parts including eyebrows, eyes, a nose, and a mouth on the assumption that the face faces front.

16. A computer readable medium encoded with computer executable instructions for detecting facial parts position, including:

detecting right and left ends position of a face on the basis of a captured face image;

setting a facial parts region indicating region where facial parts exists on the basis of the detected right and left ends position of the face;

detecting horizontal edges of the facial parts on the basis of the captured image;

creating a horizontal edge histogram by projecting the detected horizontal edges of the facial parts in a horizontal direction;

setting a plurality of peaks of the created horizontal edge histogram as proposed positions; and detecting an optimum position of the facial parts region on the basis of each of the set proposed position and the set facial parts region by detecting the horizontal edges, which are symmetric with respect to an axis of symmetry, in the facial parts region by applying the parts region to the proposed position, and detecting a position of the facial parts region where the number of horizontal edges, which are symmetric with respect to the axis of symmetry, is the maximum as the optimum position of the facial parts region.

* * * * *